United States Patent [19]

Mekosh, Jr. et al.

[11] 4,281,881
[45] Aug. 4, 1981

[54] ANTI-LOCKING MECHANISM

[75] Inventors: George Mekosh, Jr., Warrington; David O. Hulse, Lionville, both of Pa.

[73] Assignee: The Budd Company, Troy, Mich.

[21] Appl. No.: 26,795

[22] Filed: Apr. 3, 1979

Related U.S. Application Data

[63] Continuation-in-part of Ser. No. 939,178, Sep. 5, 1978, abandoned.

[51] Int. Cl.³ .............................................. B60T 8/093
[52] U.S. Cl. ................................. 303/99; 188/181 A
[58] Field of Search ............ 188/181 A; 303/99, 108, 303/7, 9, 116, 118; 200/61.46; 73/515; 310/68 E; 137/38

[56] References Cited
U.S. PATENT DOCUMENTS

| | | | |
|---|---|---|---|
| 3,441,320 | 4/1969 | Flory | 188/181 A X |
| 3,752,268 | 8/1973 | Gfeller | 188/181 A |

*Primary Examiner*—J. D. Miller
*Assistant Examiner*—Reinhard J. Eisenzopf
*Attorney, Agent, or Firm*—A. L. Trueax, Jr.

[57] ABSTRACT

An anti-locking mechanism includes an assembly attached to move with a wheel of a vehicle. The assembly includes a spring biased inertia wheel movably mounted to a manifold. A valve connected to control the application of braking pressure is normally held closed when the inertia wheel and manifold are rotated at the same rate by the wheel. When the vehicle wheel is decelerated at an excessive rate, the inertia wheel overcomes the bias of the spring and continues to rotate about the manifold to open the valve and prevent braking pressure from being applied to the wheel.

22 Claims, 9 Drawing Figures

ANTI-LOCKING MECHANISM

The application is a continuation-in-part of application Ser. No. 939,178, filed Sept. 5, 1978, now abandoned.

Brake control devices for preventing locking or sliding of vehicle wheels when the brakes are applied by an operator are well known. Such devices have included means for automatically controlling the release and reapplication of the wheel brake. Such "anti-lock" devices have been used in automotive vehicles such as trucks, truck trailers and buses, as well as in railway cars.

Brake control anti-lock devices have included, for example, rotary inertia type devices sensitive to acceleration and deceleration of a vehicle wheel, which may be installed within the hubs of existing truck-trailer wheels. One such device is described in a patent to Doolittle U.S. Pat. No. 2,772,904. This patent discloses spring biased valve mechanisms in the hubs of wheels and which include inertia wheels to open the valves upon sudden deceleration. Another anti-slide device for vehicle wheels is disclosed in a patent to Mortimer U.S. Pat. No. 2,964,048. Patents relating to anti-lock systems for railway wheels are disclosed in U.S. Pat. No. 2,365,180 to Eksergian and U.S. Pat. Nos. 2,369,726 and 2,426,575 to Eksergian et al.

In general, devices used heretofore have involved relatively complex mechanisms or have required electrical circuitry to accomplish the desired anti-lock results. In the main, prior art devices have not included relatively simple means to enable a vehicle operator to check the operation of the anti-lock system to assure that it is functioning properly.

In the prior art when solely mechanical components were used, their complexity made it more difficult to absorb the excessive energy when the inertia valve was opened abruptly by sudden deceleration. Also, the complexity of the mechanical arrangement made it difficult to accurately predict the precise conditions under which the inertial valve devices opened or closed. Such unpredictability is especially prevalent when spring loaded valves found in some of the prior art devices operated in a plane parallel to the plane of rotation of the inertial devices and subject to frictional or energy forces which affects the sensitivity of the inertia valves.

It is an object of this invention to provide a novel means to enable an operator to conveniently check the operation of an anti-lock system.

It is a further object of this invention to provide an improved anti-lock system in which excessive energy developed in the device during excessive deceleration is absorbed.

It is still a further object of this invention to provide an improved anti-lock device including an inertia valve in which the sensitivity of operation is relatively uniform and not subject to changes resulting from varying frictional forces when the valve is opened or closed.

It is still a further object of this invention to provide an improved anti-lock device for a braking system which is free of electrical components and complex mechanical elements.

In accordance with the present invention, an anti-lock apparatus includes a rotatable manifold member attached to be rotated with a wheel of a vehicle. The manifold member includes an aperture between a pressure chamber and atmosphere. An inertia wheel is movably mounted to rotate with the manifold member. A valve is associated with the inertia wheel and disposed to close or open the aperture leading from the pressure chamber to atmosphere. A stop member, connected to the manifold member normally contacts a stop pin on a wheel to cause it to be normally rotated at the same rate of speed as the manifold member to maintain the valve closed. A bias spring connected between the inertia wheel and manifold aids in keeping the valve closed. Upon excessive deceleration or locked wheel conditioning the inertia wheel continues to move with respect to the manifold member. The bias of the spring is overcome to open the valve and release the pressure from the chamber to the atmosphere. This causes the braking pressure to the wheel to be released. Upon extremely high deceleration, with the valve open, means are provided to permit the inertia wheel and manifold to move in unison and absorb the energy resulting from the excessive deceleration. Manual check outs are provided to enable an operator to check the operation of the valve and other components in the anti-lock apparatus.

Other objects and advantages of the present invention will be apparent and suggest themselves to those skilled in the art, from a reading of the following specification and claims, taken in conjunction with the accompanying drawings, in which:

The components found in conventional systems will be described briefly for a better understanding of the invention.

As is well known, there are primary and emergency pressure tank systems included in most trailers. The emergency tank system is charged by air pressure from the tractor's system through an emergency supply line. When the air pressure from the tractor reaches a valve, generally referred to as a ratio relay valve, it charges the emergency tank, various hoses and the emergency side of the mechanical spring brakes. It also charges the primary tank.

When the pressure in the emergency tank reaches a predetermined level, such as 60 psi, the spring brakes begin to react and a shuttle valve in the ratio relay valve permits the air pressure to charge a primary tank. Generally, the spring brakes are completely released at a higher pressure, for example 90 psi.

Application of the parking brake or loss in the emergency line pressure will generally cause the pressure of the ratio relay valve to be relieved, and the air pressure is exhausted from the emergency brake hoses and spring brakes. When the pressure falls below 60 psi the mechanical spring brakes are automatically applied.

When the spring brakes are released and service brakes are applied by an operator in the tractor, air pressure will flow from a source within the tractor through the service line into the service system of the trailer.

The service pressure is applied to a relay valve which permits the air pressure in the primary tank to be applied to the service brakes.

Release of the service brakes causes the air pressure in the service line to be exhausted causing the relay valve to release the delivery air pressure from the service sides of the brake chambers to release the service brakes.

Figure 1:
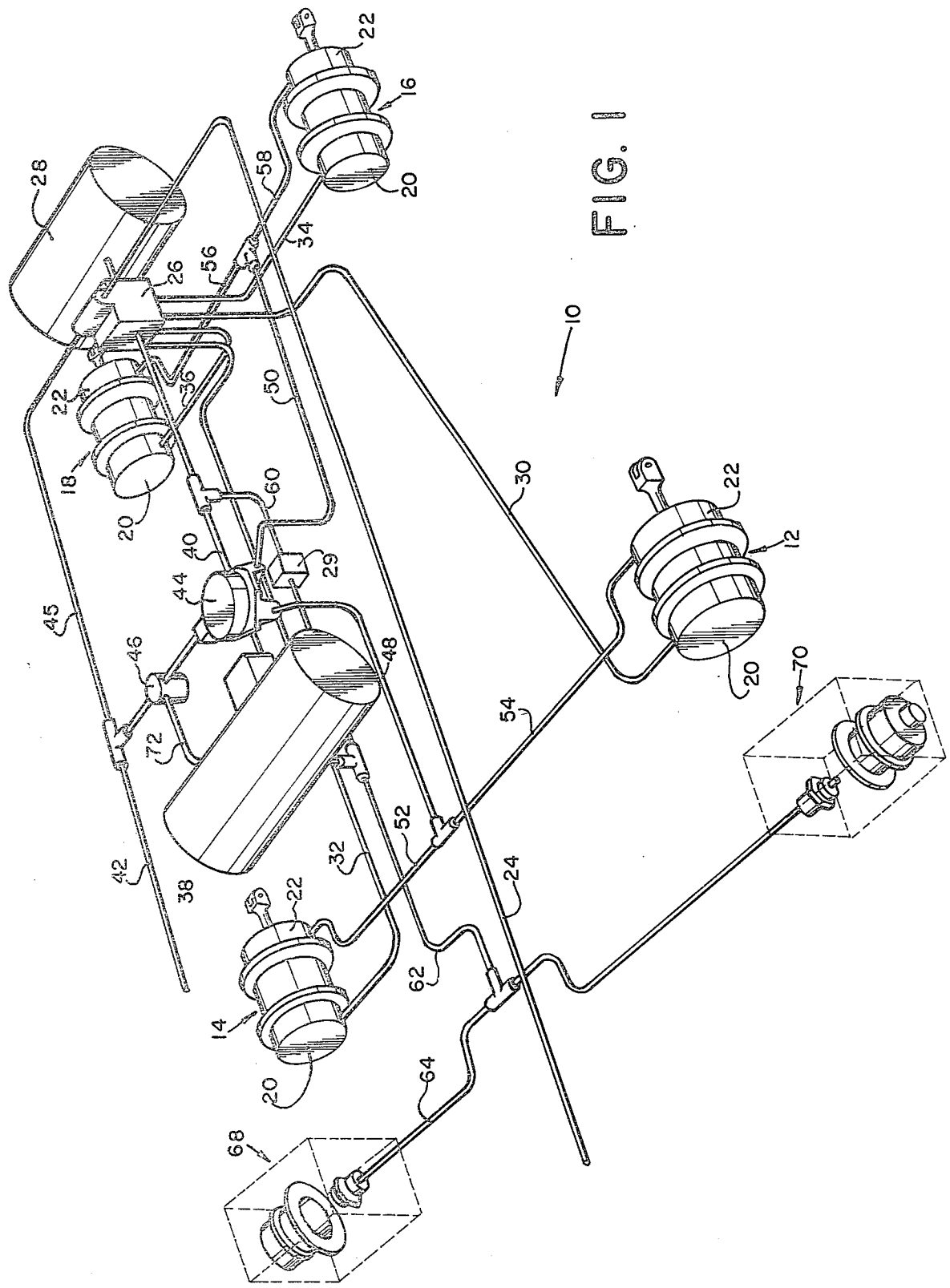
FIG. 1 is a schematic representative of a braking system for a trailer, embodying the present invention.

Referring particularly to FIG. 1, a brake system 10 of a two axle trailer includes a pair of front brake assemblies 12 and 14 and a pair of rear brake assemblies 16 and 18. All the brake assemblies illustrated may be of the conventional type. For example, each of the assemblies include a parking brake chamber 20 and a service brake chamber 22.

The main air pressure from the tractor is applied to an emergency or supply line 24. As air pressure reaches a ratio relay valve 26, it is directed to charge an emergency tank 28 and to hoses 30, 32, 34 and 36 which are connected to the parking brake chambers 20 of the brake assemblies 12, 14, 16 and 18, respectively. With no pressure in the parking brake line or hoses 30, 32, 34 and 36, the brakes are mechanically applied and the trailer cannot be moved.

When the pressure in the emergency tank 28 and hoses 30, 32, 34 and 36 reach a predetermined pressure, for example 60 psi, the parking brake springs (not illustrated) in the parking brake chambers 20 begin to release the brakes. As the pressure reaches 60 psi, a shuttle valve in the ratio relay valve 26 allows air pressure to charge a primary tank 38 through a line 40. The pressure in the tank 28 continues to rise to about 90 psi, for example. When the pressure in the primary tank 38 reaches 90 psi, the spring brakes are fully taken off and the trailer may be moved. As previously mentioned, application of the parking brake or loss in the supply line pressure will cause the pressure from the relay valve 26 to be relieved to thereby exhaust the air pressure from the parking brake chambers and thus mechanically reapply the spring brakes.

With the spring brakes released, application of the service brake, resulting from an operation inside the tractor will cause air pressure to be applied into the system from the tractor to the trailer through a service line 42. The service line 42 is normally at zero pressure until the service brakes are applied.

When the service brakes are applied, the relatively large volume of the primary tank 38 is applied to the service chambers 22 of the brake assemblies 12, 14, 16 and 18 through a relay valve 44. The service pressure is applied to the relay valve 44 through slave valve 46. The slave valve 46 is held open during normal operation by pressure and closes under a lock-up condition of the wheels of the vehicle as will be subsequently described in greater detail. One side of the ratio relay valve 26 leading to a line 45 serves as an anti-compounder. This is not related to the invention but anti-compounding generally prevents service pressure from adding to the supply pressure and prevents possible rupture of other components involved.

Pressure from a pilot line, to be described, normally maintains the slave valve 46 open. Greater service pressure which is applied by the operator to the brake pedal, for example, will cause more pressure to pass from the primary tank 38 through the relay valve 44 to the service brakes 22 through lines 48, 50, 52, 54, 56 and 58. Basically, the relay valve 44 may include a diaphragm disposed to receive pressure from the service line 42. Greater pressure on this diaphragm permits greater pressure to flow through the valve 44 from the primary tank 38 to the service brake chambers 22. When the driver or operator removes his foot from the pedal or other service pressure control mechanism, the pressure in the service line 42 drops and the pressure against the diaphragm in the relay valve 44 is released to prevent pressure from passing from the primary tank 38 to the service brake chambers 22.

The anti-lock mechanism involving the present invention includes means for closing the normally open slave valve 46 to prevent pressure in the service line 42 from reaching the relay valve 44. With no service pressure applied to the relay valve 44, the pressure from the primary tank 38 to the service brake chambers 22 will be blocked. As a result, no pressure will be applied through the lines 48, 50, 52, 54, 56 and 58 to the service brake chambers 22 of the brake assemblies 12, 14, 16 and 18.

The slave valve 46 is normally held open by what will be referred to hereinafter as pilot pressure. This is the pressure in lines 60, 62, 64, 66 and 72 connected to anti-lock devices 68 and 70 illustrated in dotted blocks which are connected to rotate with the wheels of the trailers. Pressure to the lines 60, 62, 64 and 66 is supplied through the valve 26 through a control valve 29 from the emergency tank 28. The conduit 72 is connected to the slave valve 46 to maintain it open.

The inertia valves 68 and 70, to be described hereinafter in detail, are connected to the slave valve 46 through the conduits 64 and 66, which are normally closed during normal braking operation. However, during "lock-up" one of inertia valves 68 or 70 opens and the pressure which keeps the slave valve 46 open is relieved causing the slave valve 46 to close and prevent the service pressure from being applied from the service line 42 to the relay valve 44. Under these circumstances, braking pressure as applied from the primary tank 38 to the service brake chambers 22 is caused to drop off and escape through the appropriate exhaust ports in the relay valve 44 (not illustrated). After unlocking of the wheels occur, the inertia valves 68 and 70 close and normal braking operations may be resumed.

The inertia valves or sensors 68 and 78 or sensors may be considered as valves which, when closed, maintain the pilot pressure in lines 62, 64, 66 and 72 and allows the slave valve 46 to maintain a normally open position. When the inertia sensors or valves 68 and 70 open, the pilot pressure drops and the slave valve 46 closes. Closing of the slave valve 46 also permits any service pressure accumulated in the relay valve 44 to exhaust. When the wheels of the vehicle come back upto speed, the inertia sensors or valves 68 and 70 close permitting the pilot lines to repressurize. When the pilot lines are repressurized to about 40 psi, for example, the slave valve 46 opens to allow service pressure to resume flow into the relay valve 44 thus permitting a reapplication of pressure from primary tank 38 to the service brake chambers 22.

Figure 2:
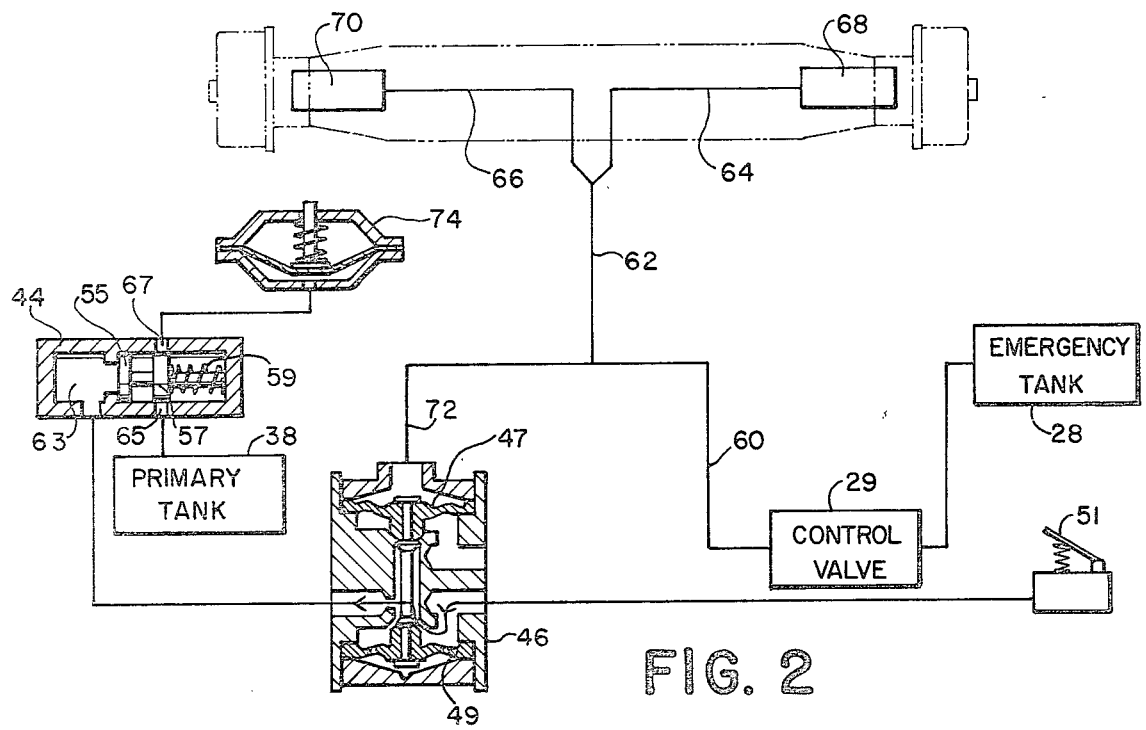
FIG. 2 is a portion of the system illustrated in FIG. 1, partly in block diagram form.
Figure 4:
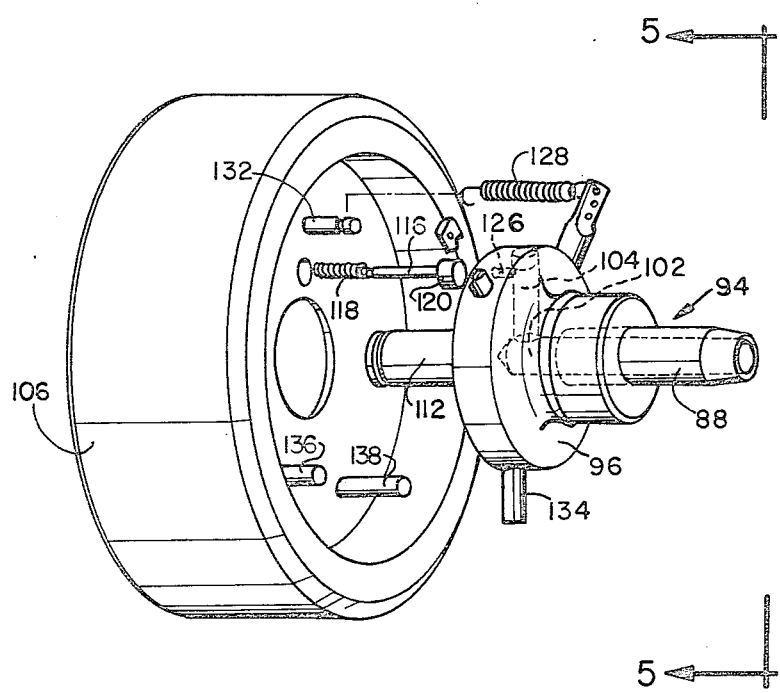
FIG. 4 is an exploded view of the main elements of the inertia valve illustrated in FIG. 3.

Referring to FIG. 2, some of the main components of the anti-lock system of FIG. 1 are illustrated. Pressure from the emergency tank 28 is applied through a control valve 29 to the slave valve 46 to force diaphragms 47 and 49 to the down open positions. Service pressure resulting from operation of a pedal 51 in the tractor passes from the line 42 through the slave valve 46 to the relay valve 44.

A simplified version of the valve 44 includes a pair of pistons 55 and 57 biased by a spring 59. Pressure from a line 61 passes through an opening in the valve 44 into the chamber 63. This pressure opposes the force of the spring 59 to cause the piston 57 to move and unblock openings 65 and 67. The distance moved by the piston 57 is proportional to the service pressure of the line 61. Braking pressure is applied to a brake 74 from the primary tank 38 through the openings 65 and 67 of the valve 44.

As previously mentioned, pressure from the emergency tank 28 passes through a valve 29 which controls the amount of pilot line pressure and fills the pilot line comprising lines 60, 62, 64, 66 and 72. The pressure in the line 72 keeps the valve 46 open. When one of the valves 68 or 70 opens, as during lock-up of their associated wheels, the pressure in the pilot line drops and the valve 46 closes.

Referring to FIGS. 3, 4, 5, 6 and 7, an anti-lock device 70 of the type which may be connected to lines 64 and 66 of FIGS. 1 and 2 and to which the present invention relates includes a housing including a lid 76 and cover 78 mounted to a hub cap 80. The device 70 is mounted to rotate with the hub cap of the wheel 82 of the trailer vehicle. The wheel 82 is mounted on suitable bearings to rotate about the axle 84. Parts of the device 70 extend through the lid 76 and hub cap 80 and are connected through the axle of the vehicle and to one of the pressure lines 66 providing the anti-lock means, as described in connection with FIGS. 1 and 2.

An axle plug 86 is suitably connected to the axle 84 and adapted to receive a hollow component 88. A bushing 90 is fitted into the axle plug 86 to receive the component 88 therethrough. A seal 92 is provided between the bushing 90 and the axle plug 86. Hollow component 88 provides a pressure seal between the rotating manifold and the stationary axle.

The opposite end of the component 88 extends into a manifold 94 which carries the various elements which are disposed within the housing between the cover 78 and lid 76. The manifold 94 extends through a central opening in the hub cap 80 and held in place by a boss 96 which abuts the outside of the hub cap 80 and a retainer 98 in a groove of the manifold with a washer 99 disposed inside the hub cap 80 at one end of the manifold 94.

As illustrated in FIG. 1, during normal operation, pilot pressure is applied into the line 66 and hollow component 88 into a chamber 102. The boss 96 includes a radially extending opening 104 with a perpendicular opening 126 extending from the chamber 102 which are normally held closed by valve means, to be described, with the valve means opening under a locking condition of the wheel 82.

An inertia wheel or flywheel 106 is disposed on bearings 108, held in place by bearing retainer 110, on the forwardly extending portion 112 of the manifold 94. The inertia wheel 106 is driven at the same speed as the vehicle wheel 82 except under locking conditions.

The inertia wheel 106 includes an opening 114 extending partly therethrough to receive a stem valve 116 surrounded by a bias spring 118 therein. The stem valve 116 includes an enlarged end portion 120 corresponding to the size of the end of the opening 114. The other end of the stem 120 is held in the opening by means of a retaining ring 122 included in a cut-away portion of the inertia wheel 106. The spring 118 surrounds the stem of the valve 116 and is biased forwardly so that the end portion 120 blocks the aperture 126, which leads to the chamber 102 through the opening 104 in the manifold 94. It is noted that in some cases the valve arrangement may comprise an opening in the inertia wheel adapted to be aligned or misaligned with an opening in the manifold to provide the valving action.

Figure 5:
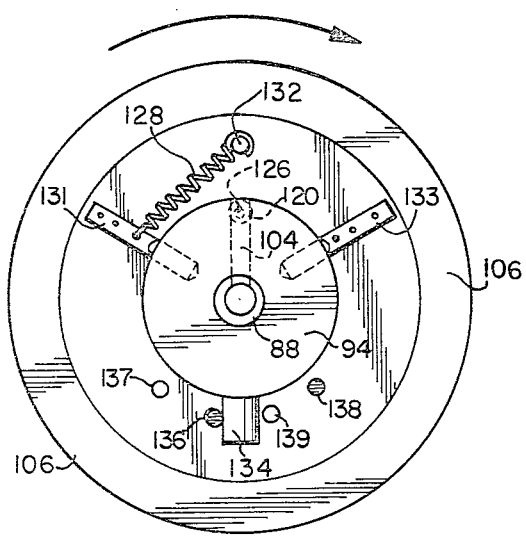
FIG. 5 is a plan view generally taken along lines 5—5 of FIG. 2 with the inertia device assembled, illustrating connections for the road side position of the inertia valve.
Figure 6:
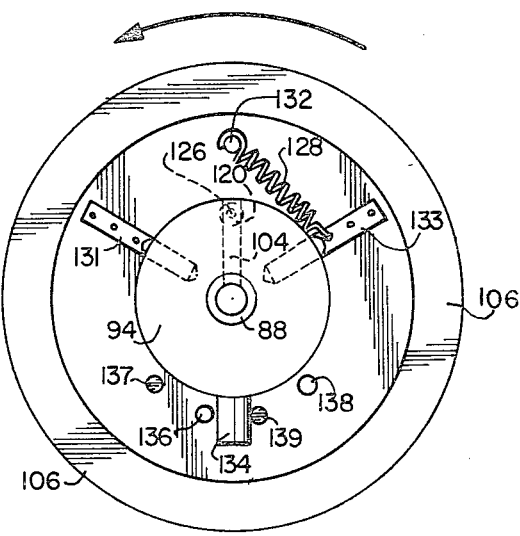
FIG. 6 is a plan view somewhat similar to FIG. 5 illustrating connections for the curb side position of the inertia valve.

FIGS. 5 and 6 are substantially the same with the connections illustrated in FIG. 5 being for the road side of the trailer and FIG. 6 being for the curb side. Four stop pin openings are provided in the inertia wheel although only two are used. The additional openings provide for either road or curb side connections and make it possible to provide a uniform device regardless of which side of the trailer is involved.

As illustrated in FIGS. 5 and 6, the inertia wheel 106 is normally spring biased in a direction to maintain the valve 116 (FIG. 3) in a closed position with respect to the apertures 126 and 104. This is accomplished by means of a tension spring 128 connected to a pin 132 on the inertia wheel 106 and pin 131 in FIG. 5 or pin 133 in FIG. 6 on the manifold 94. The spring 128 normally urges the inertia wheel 106 in the same direction as the movement of the manifold 94 and wheel 82 as indicated by the arrow. However, the valve is normally kept closed as a result of a stop member on the manifold 94 contacting a stop pin on the inertia wheel.

A dowel pin 134 is connected to the periphery of manifold 94 and disposed between two stop pins 136 and 138 in FIG. 5 and pins 137 and 139 in FIG. 6 which are connected to the face of the inertia wheel 106. In FIG. 5 rotation of the manifold 94 normally keeps the dowel pin 134 in driving contact with the stop pin 136. The spring 128 provides additional bais to maintain the dowel pin 134 against the pin 136.

The bias of the spring 128 helps establish threshold levels at which the valve opens and closes during locking and unlocking conditions.

One of three different operating conditions may be present in the anti-lock apparatus illustrated. The first considered is that of normal deceleration during braking. In this case, the inertia wheel and manifold will decelerate without a change in their relative positions and the valve will remain closed. A second condition involves high deceleration or lock up in which the valve opens and closes as the wheel decelerates and speeds up whereby the valve opens and closes until the normal speed of the inertia wheel and manifold is resumed. A third condition is when the deceleration is excessive and the excess energy must be absorbed before the closing of the valve can take place.

When the valve comprising the valve 116 and apertures 104 and 126 opens, as a result the inertia wheel 106 rotating with respect to the manifold 94, the stop 138 moves into contact with the dowel pin 134 thereby limiting the angular degree of movement of the inertia wheel 106 with respect to the manifold 94. Likewise in FIG. 6, a similar operation will take place with the dowel pin 134 adapted to be moved in a limited angle between stop pins 137 and 139.

The arrangement of the stop pins 136 and 138 (FIG. 5) and 137 and 139 (FIG. 6) with the dowel pin 134 not only limits the degree of relative rotation of the inertia wheel 106 with respect to the manifold 94, but also relates to an energy absorbing feature of the present invention which makes it possible for the system to absorb excessive energy in the inertia wheel during excessive deceleration. This feature will be considered along with FIG. 5, it being understood that the same conditions apply to the arrangement of FIG. 6. The stop pins 136 and 138 on the inertia wheel has the dowel pin 134 on the manifold 94 disposed therebetween. The spring 128 connected between the pin 132 on the inertia wheel and the pin 131 on the manifold provides bias to keep the valve 116 closed with respect to aperture 126. During normal operation, the manifold 94 is connected to move with the hub 80 of the wheel of the vehicle. If the wheel and hub of the vehicle suddenly stops rotating, the manifold 94 stops. However, when the deceleration rate is relative high, the inertia wheel 106 will tend to continue rotating in the direction of the arrow causing the inertia wheel 106 to overcome the bias of the spring 128 and to rotate with respect to the manifold 94. The rotation of the inertia wheel 106 with respect to the manifold 94 is limited because the stop pin 136 will move away from the dowel pin 134 and continue to move until the second stop pin 138 is hit by the dowel pin 134. The dowel pin 134 on the manifold 94 is therefore adapted to be relatively moved with respect to the inertia wheel between the two stop pins 136 and 138 connected to the inertia wheel 106. During a braking operation in which the wheel is decelerated at a relatively high but not excessive rate, i.e. the second operating condition mentioned above, the dowel pin 134 will move between the pins 136 and 138 opening and closing the valve as it does so. When the wheel again comes up to speed and the manifold and inertia wheel are moving together the dowel pin 134 contacts the pin 136 to close the valve. The spring 128, which had been extended during deceleration, will then be retracted.

Under the third operating condition involving excessive deceleration the stop pin 138 contacts the dowel pin 134 with excessive force or energy, greatly beyond the normal deceleration forces and the inertia wheel 106 will continue to rotate moving the manifold 94 as it does so. As a result the inertia wheel and manifold rotates as a single assembly. This feature provides energy absorption during excessive deceleration. Without this feature, the dowel pin 134 on the manifold 94 would tend to bounce back and forth off stop pin 138 causing chatter and irregular operation of the valve assembly.

When the pin 138 on the inertia wheel 106 contacts the pin 134 on the manifold 94 during a "locked up" condition, the inertia wheel 106 has moved its maximum travel with respect to the manifold 94. If there is still sufficient energy that has not already been absorbed or stored in the spring 128, then the entire assembly including the manifold 94 and the inertia wheel 106 will rotate and slip on the hub 80 (FIG. 3).

Figure 3:
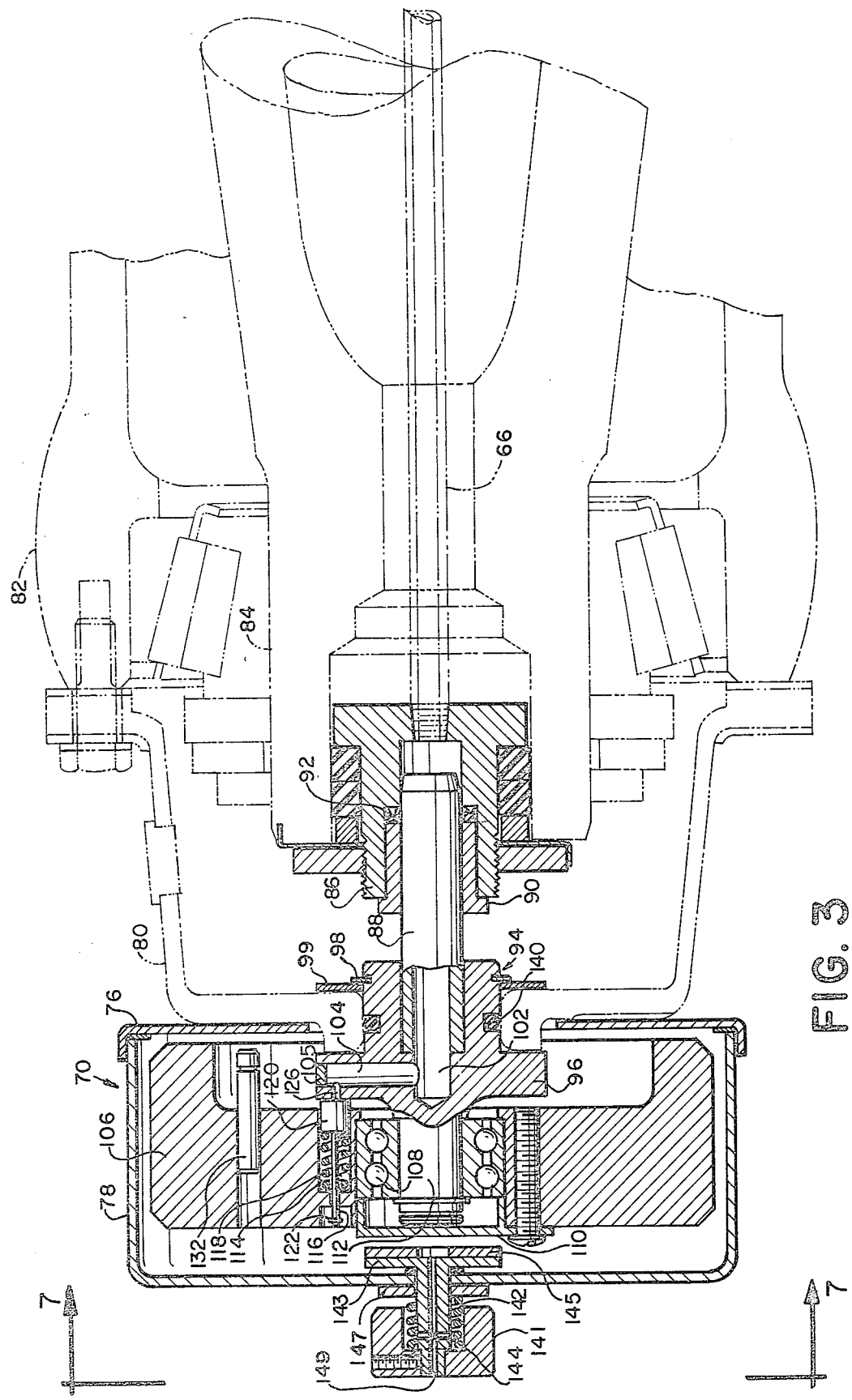
FIG. 3 is a cross sectional view of an inertia valve, in accordance with the present invention.

As illustrated in FIG. 3, the manifold 94 extends through the hub cap 80 and is held on to the hub cap by a washer 99 and a retainer 98. The manifold 94 is not rigidly mounted to the hub cap 80 and the washer 99 and retainer 98 keeps manifold 94 mounted in the axial direction so that it can be rotated. The arrangement comprises a somewhat loose fitting to allow assembly including the manifold with the inertia wheel to slip in the presence of excessive deceleration forces. An "O" ring 140, disposed in a groove in the periphery of the manifold 94 keeps the manifold from normally turning. It also serves as a barrier to prevent foreign matter in the hub cap from entering the space between the cover 78 and lid 76 to possibly cause erratic action of the components in the anti-lock apparatus.

The "O" ring 140 disposed in a groove of the periphery of the manifold 94 and in contact with the center hole of the hub cap may serve two purposes. It prevents oil and other foreign matter from leaking out from between the manifold 94 and hub cap 80. More importantly, it also provides friction torque which contributes to the energy absorption feature of the present invention. It is understood of course that the friction torque between the manifold and hub cap may be provided by various other means. For example, a second "O" ring or friction material may be provided between the washer 99 and the inner surface of the hub cap close to its center.

As mentioned when the deceleration of the vehicle wheel and hub 90 is less than required to overcome the bias of the spring 128 (FIGS. 5 and 6) and nothing happens with respect to the anti-lock system, i.e., the wheel 82 decelerates to a gradual stop with the relative positions of the manifold 94 and inertia wheel 106 remaining the same. During this condition, the manifold 94, inertia wheel 106 and hub 80 all decelerate uniformly. During the second operating condition involving high deceleration, the inertia wheel and manifold rotate about small angles with respect to each other to open and close the valve until normal speed of the vehicle wheel is resumed.

During excessive deceleration resulting in the anti-lock system becoming actuated the dowel pin 134 contacts stop pin 138 with excessive force and the excess energy in the inertia wheel 106 has to be dissipated to assure satisfactory operation. The spring 128 (FIGS. 5 and 6) will only dissipate small amounts of energy and will absorb or store a certain amount of energy. The stored energy in the spring 128 is used to help restore the inertia wheel 106 to its starting position with respect to the manifold 94 after the final lock up in a sequence of lock ups has occured. The spring 128, however, helps establish the threshold levels of operation of the valve. The valve mechanism will operate with a lesser degree of efficiency without the spring 128.

Under normal operating conditions, the manifold 94 will not rotate within the hub cap 80. During normal acceleration or deceleration, the manifold 94 moves with the hub cap 80. During excessive deceleration, i.e. during the third operation mentioned above, when the inertia wheel is moved to the full extent, as determined by the various stop pins illustrated in FIGS. 5 and 6, the spring 128 is extended, the stop pin 138 contacts the dowel pin 134 in the inertia wheel 106. When this contact is made, and there is still excessive energy available, the entire assembly including the inertia wheel 106 and manifold 94 slips in the hub cap 80. When the assembly slips in the hub cap 80, the member 88 will rotate within the bushing 90. This is the condition in which the wheel 82 is stopped or excessively decelerated and inertial wheel 106 and manifold 94 are still rotating and absorption of excess energy resulting from excessive deceleration takes place.

However, it should be realized that during normal operation, the manifold 94 is locked to the hub cap 80. When the wheel 82 turns, the hub cap 80 turns, the manifold 94 turns. It is only during the high energy levels during deceleration that the manifold 94 will slip in the hub cap 80.

Under moderate deceleration, when going into a skid which is not severe, the wheel 82 slows down faster than the inertia wheel 106, i.e., the inertia wheel 106 rotates ahead of it. When the inertia wheel 106 over-travels, it opens the inertia valve and the pilot pressure is bled from the line 66, which in turn relieves the pressure from the slave valve 46 (FIGS. 1 and 2). If the wheel 82 then spins up, the inertia valve will close and the pilot line repressurizes.

The condition in which the energy absorber comes into operation is during very high deceleration where the wheel 82 is rotating at a high rate of speed, the brakes suddenly are applied and the wheel speed comes down very rapidly. The manifold 94 stops abruptly and the inertia wheel 106 continues on and until it is stopped with respect to the manifold by stop pin 138 (FIG. 5) and causes the whole assembly including the inertia wheel and manifold to be driven. This causes the energy resulting from excessive deceleration to be dissipated. After the energy stored up in the inertia wheel 106 is dissipated, the manifold and inertia wheel will stop rotating together as a single assembly within the hub cap 80. When the energy is further dissipated, the spring 128 is gradually retracted to close the valve to permit normal braking pressure to be resumed.

Figure 7:
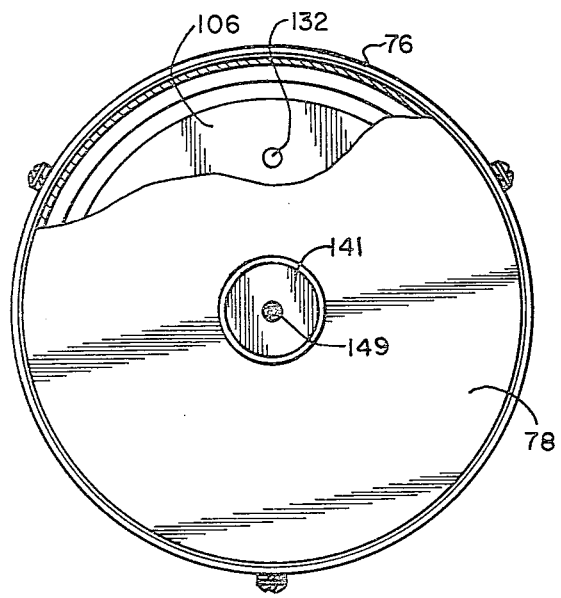
FIG. 7 is a view taken along lines 7—7 of FIG. 3.

Another feature of the present invention relates to checking the system for proper operation as illustrated in FIGS. 3 and 7. As previously discussed, when the inertia wheel 106 is rotated with respect to the manifold 94, the spring loaded valve 116 opens the apertures 104 and 126 in the manifold 94 to connect the pilot pressure in chamber 102 which is the pilot pressure venting to atmosphere through an opening 149 in a pushbutton knob 141 leading to the interior of the housing including the cover 78 and lid 76.

A manual control for checking the operation of the valve system is provided by a pushbutton knob 141 suitably connected to a shaft 142 including an end disc 143. A spring 144 is disposed between a wear element 147 mounted to the front face of the cover 78 and the knob 141 to normally urge the knob 141 outwardly away from the cover 78. The disc 143 includes friction means 145 secured thereto.

When the knob 141 is manually pushed inwards, the friction means 145 engages the surface on the element 110. If the knob 141 is pushed in and then manually rotated in a counter clockwise direction (see FIGS. 5 and 6), the inertia wheel 106 is rotated to move the stop pin 136 (FIG. 5) away from the dowel pin 134 to open the stem valve 116. This causes pressure from the line 66 to be released through the apertures 104 and 126 of the manifold 94. The sudden release in pressure produces a pronounced hissing sound to indicate to the operator that the pilot line valve and other components related to the anti-lock mechanism are functioning properly. As may be seen, the manual operation of the knob 141 causes movement of the inertia wheel with respect to the manifold in the same direction as the movement during high deceleration of the locking vehicle wheel.

Another feature of the present invention relates to the position of the valve in the inertia wheel with respect to the manifold. The valve 116 is in front of the face portion of the manifold 94 rather than on its periphery. Because of this, the pilot pressure in the line 66 does not have the tendency to aid or slow down the motion of the inertia wheel 106. This is because the forces in the plane of rotation of the inertia wheel 106 are minimized. This would not be the case if the valve were disposed on the periphery of the inertia wheel. Variable forces at the periphery of the manifold tends to vary the sensitivity of the inertia wheel 106 and therefore its ability to operate at the same threshold level under different anti-locking conditions.

The spring 128 (FIG. 5) and frictional forces determine to a great extent the threshold level at which valve 116 operates. This is not necessarily directly related to the speed of the vehicle, but rather is related to the speed at which the wheel locks. Related to the frictional forces is the energy absorption feature. It is important that each lock and release in the system start with the same amount of energy in the inertia wheel. A vehicle traveling 50 mph, for example, will impart more energy to the inertia wheel than one driven at 10 mph. Excess energy must be absorbed. In the present invention, each lock release sequence starts with the same amount of energy in the wheel.

Figure 8:
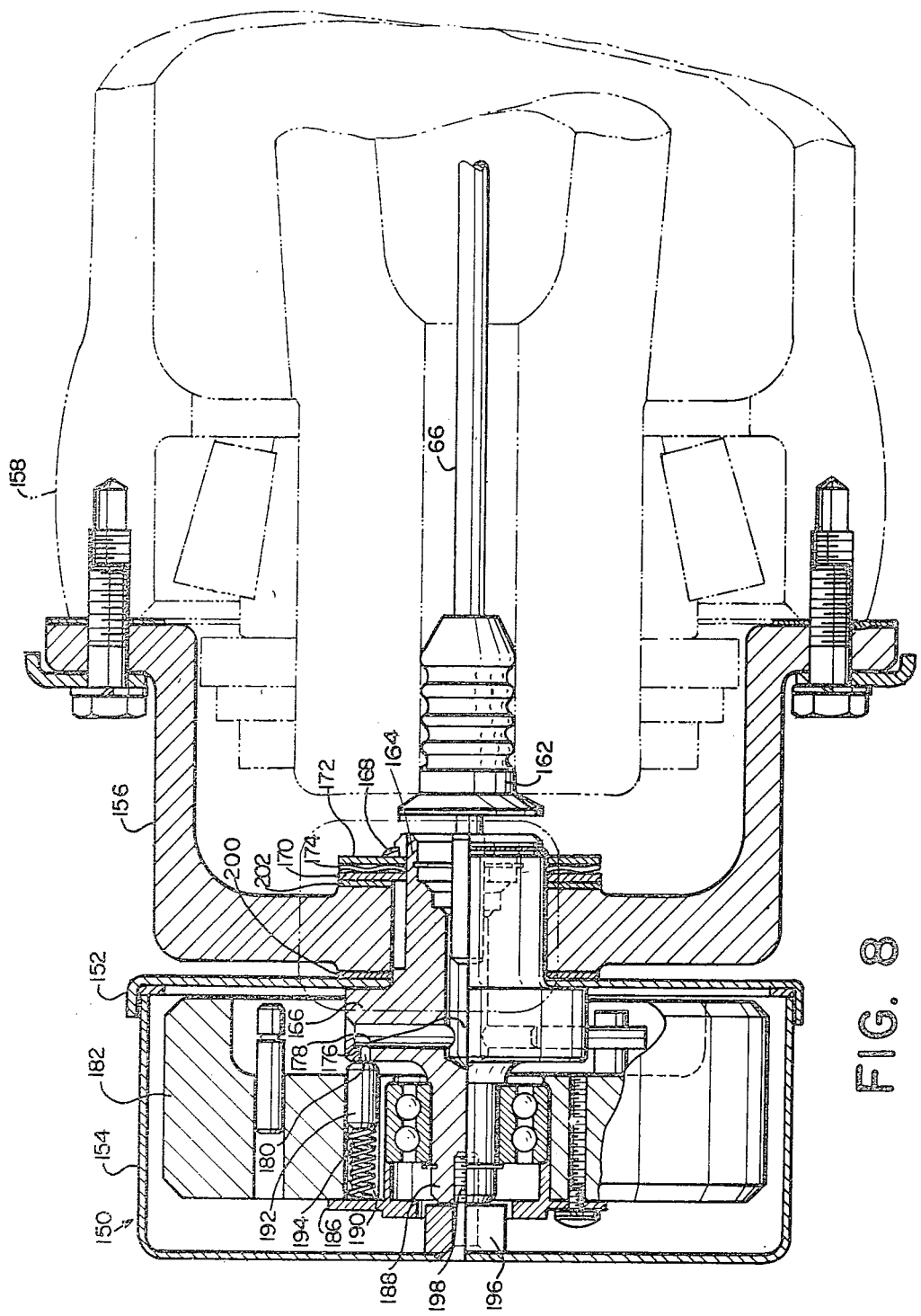
FIG. 8 is a cross sectional view of another embodiment of an inertia valve, in accordance with the present invention.

The main difference between the embodiments illustrated in FIGS. 3 and 8 is in the means for checking the operation of the valve system. The embodiment of FIG. 8, in addition to checking the valve anti-lock mechanism, also provides means for checking the operation of the energy absorber system. Because all the other features between the two embodiments are substantially the same in structure and operation, only the features of FIG. 8 which are different than FIG. 3 relating to the means for checking the valve anti-lock and energy absorber systems will be discussed in connection with FIGS. 8 and 9. The various pin, stop and spring arrangements and their operations as illustrated in FIGS. 5 and 6 are the same for both the embodiments illustrated in FIGS. 3 and 8 and the descriptions related thereto will not be referred to in connection with FIG. 8.

Figure 9:
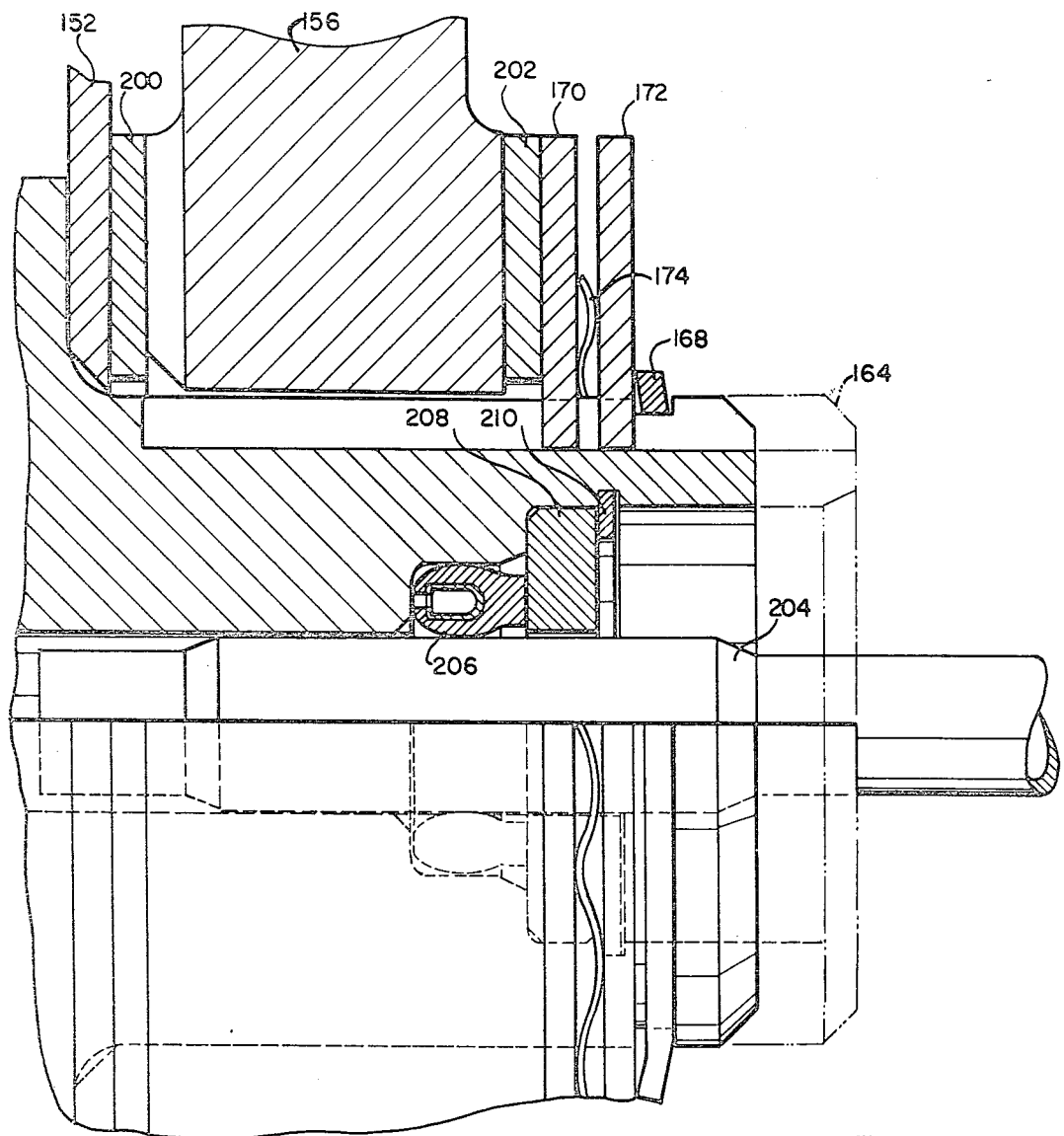
FIG. 9 is an enlarged cross sectional view of a portion of the inertia valve illustrated in FIG. 8.

FIGS. 8 and 9 relate to the check out feature by which the operation of the valve anti lock and energy absorber systems may be readily checked. The embodiment illustrated also involves simplification of some of the connections. Outside of these items the embodiment of FIGS. 8 and 9 involve substantially the same parts and operate the same as the device previously described in connection with FIG. 3.

An anti-lock device 150 includes a housing having a lid 152 and cover 154 mounted to a hub cap 156. The device 150 is mounted to rotate with the hub cap of the wheel 158 of the trailer vehicle. The wheel 158 is mounted on suitable bearings to rotate about the axle 160. Parts of the device 150 extend through the lid 152 and hub cap 156 and are connected through the axle of the vehicle and to one of the pressure lines 66 providing the anti-lock means, as described in connection with FIGS. 1 and 2.

An axle plug 162 is suitably connected to the axle 160 and is attached to pressure line 66. The bushing 90 is fitted into the axle plug 86 to receive the component 88 therethrough; as illustrated in FIG. 3, are not required in the embodiment of FIGS. 8 and 9. Nor are the elements 88 or 92 of FIG. 3 required in this embodiment.

The end of the flexible plug 162 is detached from a manifold 164 which carries the various elements which are disposed within the housing between the cover 154 and lid 152. The end plug 162 provides three features: First, it provides a central locating positioner for items 66 and 64. Second, it provides pressure equalization between hub cap cavity and atmosphere. Third, it provides a "lack of necessity" for true concentricity and alignment between the hole in said manifold and the wheel. The manifold 164 extends through a central opening in the hub 156 and held in place by a boss 166 which abuts the outside of the hub cap 156 and a bowed retainer ring 168 in a groove of the manifold, with tab washers 170 and 172, which may be metal or other material, disposed inside the hub cap 156 at one end of the manifold 164. A spring wavy washer 174 is disposed between tab washers 170 and 172.

As illustrated in FIG. 1, during normal operation, pilot pressure is applied into the line 66 into a chamber 176 in the manifold. The boss 166 includes a radially extending opening 178 with a perpendicular opening 180 extending from the chamber 176 which is normally held closed by valve means, to be described, with the valve means opening under a locking condition of the wheel 158.

An inertia wheel or flywheel 182 is disposed on bearings 184, held in place by bearing retainer 186, on the forwardly extending portion 188 of the manifold 164. The inertia wheel 182 is normally driven at the same speed as the vehicle wheel 158 except under locking conditions.

The inertia wheel 182 includes an opening 190 extending therethrough to receive a valve 192 forwardly biased by a bias spring 194. The retainer 186 retains the spring 194 in place. The spring 194 is biased forwardly so that the valve 192 blocks the aperture 180, which leads to the chamber 176 through the opening 194 in the manifold 164. As mentioned, FIGS. 5 and 6 are also applicable to the embodiment illustrated in FIGS. 8 and 9 as far as the basic operation of the anti-lock valve system is concerned. The various pin arrangements and stops and operations relating thereto are the same for the embodiments of FIGS. 8 and 3. Therefore this portion of the operation is not repeated and no new reference numerals are applied.

Features of the embodiment of FIG. 8 which are different than those illustrated in FIGS. 3 and 7 relate to the manual check out feature. The manual control for checking the operation of the anti-lock valve system in FIG. 3 is provided by manually operating a pushbutton knob 141. The embodiment of FIG. 8 involves manually actuating the cover 154. In FIG. 3, the knob 141 was manually pushed inwards so that the friction means 145 engaged the surface of the element 110 and then manually rotated to rotate the inertia wheel 106 to move the stop pin 136 away from the dowel pin 134 to open the stem valve 116. In FIG. 8, the cover 154 is manually gripped and rotated. A spacer connector member 196 is secured to the cover 154 and a screw 198 connects the cover 154 and member 196 to the forward portion 188 of the manifold 164. Rotation of the cover 154 causes rotation of the manifold 164. No pushing of a knob is required and the relatively large cover makes gripping and turning easier because it makes it possible for an operator to apply a higher torque to the system. In checking the anti-lock valve system, the cover 154 and manifold 164 should be moved relatively fast so that the manifold 164 is rotated with respect to the inertia wheel 184 to assure opening of the valve 192. Thus, the knob of FIG. 3 rotates the inertia wheel whereas the cover of FIG. 8 rotates the manifold to obtain the same test of the anti-lock valve system.

Referring to FIGS. 8 and 9; as in the case of the embodiment of FIG. 3, the condition in which the energy absorber comes into operation is during very high deceleration where the wheel 158 is rotating at a high rate of speed, the brakes suddenly are applied and the wheel speed comes down very rapidly. The manifold 164 stops abruptly and the inertia wheel 182 continues on and until it is stopped with respect to the manifold by stop pin 138 (FIG. 5) and causes the whole assembly including the inertia wheel 182, manifold 164, cover 150 and lid 152 to be driven as single unit with respect to the hub cap.

The energy absorption is provided by the plastic washers 200 and 202 disposed inside and outside the hub cap 156. Continued rotation of the cover 154, inertia wheel 182, cover 150, lid 152, and manifold 164 is permitted by the sliding frictional action of the washers 200 and 202. The degree of energy absorbed depends to a great extent upon how tight or how loose the washers 200 and 202 are fitted against the hub cap 156. This is determined, among other things, by pressures of the tab washers 170 and 172 and the wavy spring washer 174 disposed therebetween.

Another feature of the embodiment of FIG. 8 over that of FIG. 3 relates to checking the energy absorption arrangement. The embodiment of FIG. 8 makes it possible for an operator to readily check the energy absorption system to determine whether or not it is functioning properly.

When it is desired to check the energy absorption system, the cover 154 is manually rotated to cause the lid 152 to be also rotated. When the lid 152 is rotated so that the inertia wheel 182 does not move relatively thereto, it will slide against the washer 200 while the tab washer 170 slides with respect to the washer 202. The two friction surfaces of the washers 200 and 202 dissipate energy somewhat like a friction clutch.

Rotation of the cover and the use of the plastic washers 200 and 202 to provide the frictional operation described provides the check out feature of the energy absorption system. Generally, the system is designed to rotate upon application of from 9 to 13 inch pounds of torque. One way this is checked in the factory is to put a torque wrench on the manifold before installing the cover and rotating the manifold. Adjustments are made by tightening or loosening the fittings until the torque wrench measures between 9 and 13 inch pounds.

The amount of torque applied by an operator in the field to turn the cover 150 and lid 152 indicates whether or not the energy absorption system is operating properly. For example, if the cover 154 and lid 152 rotates too easily or is too slippery, it indicates that the system will not absorb sufficient energy during operation. On the other hand, if the manual turning of the cover 154 and the lid 152 is very difficult or "hung up" it could indicate that the energy absorption system will require too much application of energy before the system becomes effective.

An experienced operator after several tests, equipped with the knowledge of how a satisfactory system operates can generally determine whether an energy absorption system is operating different from the norm by utilizing the invention in the manner described.

Gripping and turning a relatively large cover makes it possible to apply an adequate torque to the manifold to test the energy absorption system. The use of the knob in FIG. 3 made it difficult to apply adequate torque to test the energy absorption system and therefore limited the test to checking the air pressure system.

Another method of testing would be to rotate the cover relatively fast so as to check the anti-lock valve system and the energy absorption system at the same time. If the cover is moved fast beyond a certain distance, the pin on the inertia wheel will engage the stop pin on the manifold to bring the energy absorption system into operation. This is the method that most operators would probably employ in the field because a single operation will test two functions.

Other details illustrated in FIG. 9 includes the manifold 164 in dashed lines and the end of the plug assembly 204. A spring ring mechanical rotatable seal 206 surrounds the end of the plug assembly. An internal washer 208 abuts the seal 206 and is held in place by an internal retainer ring.

While the invention has been illustrated with the pilot line connected in tandem to more than one wheel, it is apparent that the individual wheels may be connected independently of the other or others to its own anti-lock mechanism so as not to affect the operation of the other wheels in the system.

The various valves illustrated in FIG. 1 and somewhat simplified in FIG. 2 are commercially available items. For example, the ratio relay valve 26 may be of the type 1659-8-B, manufactured by B. F. Goodrich, the valve 44, which may be considered a modulator valve, may be of type 286370, manufactured by Bendix-Westinghouse, and the slave valve 46 may be of type 250A-3-10-20 manufactured by Humphrey.

What is claimed is:

1. In combination with a source of pressure for actuating a brake for decelerating a vehicle wheel and means for selectively applying the pressure to the brake, control means for permitting or preventing said pressure from being applied to the brake when the wheel is decelerated beyond a predetermined limit comprising:
   (a) a first rotatable member adapted to be fixedly attached to and rotated with said wheel and adapted to control said source of pressure, said first rotatable member being a manifold having an opening therein disposed between said source of pressure and atmosphere,
   (b) a second rotatable member movably mounted to said first rotatable member, said second rotatable member being an inertia wheel disposed to rotate with said manifold and to continue to rotate relative to said manifold when said manifold is decelerated beyond a predetermined rate,
   (c) valve means responsive to the relative positions of said first and second members with respect to each other disposed to close or open to control the pressure applied to said brake, and stop means for normally driving said first and second members during normal movement of said wheel and for limiting relative movement of said members during deceleration, said stop means further restricting relative movement of said members after limited movement there between,
   (d) means for maintaining the relative positions of said first and second members during normal rotation of said wheel to maintain said valve means closed to permit pressure to be applied to said brake,
   (e) said first and second members being relatively rotated with respect to each other to open said valve means when said wheel is decelerated beyond said predetermined rate to prevent pressure from being applied to said brake and biasing means connected between said members urging said valve means closed,
   (f) manual means for changing the relative position of said first and second rotatable members for manually checking the operation of said control means, said manual means comprising means normally free of said first and second rotational members and including frictional means for contacting one of said members to permit said one member to be rotated with respect to the other member to open said valve when said manual means are operated.

2. The invention as set forth in claim 1 wherein said valve means includes a spring loaded valve in said second rotatable member disposed to block or unblock said opening in said first rotatable member.

3. The invention as set forth in claim 2 wherein said spring loaded valve is disposed perpendicular to the planes of rotation of said first and second rotatable members.

4. In combination with a source of pressure for actuating a brake for decelerating a wheel on a vehicle, control means for permitting or preventing the application of said pressure to said brake of said wheel, comprising:
   (a) a rotatable manifold member attached to be rotated with said wheel and including an aperture between a chamber leading to a second source of pressure and atmosphere,
   (b) an inertia wheel movably mounted to said manifold member to rotate within predetermined limits thereon during acceleration and deceleration of said wheel,
   (c) valve means included in said inertia wheel to close or open said aperture leading from said chamber to atmosphere,
   (d) stop means connected between said inertia wheel and said manifold member to normally rotate said inertia wheel at the same rate of speed as said manifold member and to normally maintain said valve means in a closed condition,
   (e) said stop means being disposed to permit continued movement of said inertia wheel with respect to said manifold member when said wheel is decelerated beyond said predetermined limit to open said valve means thereby to permit the pressure from said second source of pressure to be relieved through the aperture in said manifold member to atmosphere to prevent said braking pressure from actuating said brake.

5. The invention as set forth in claim 4 wherein said stop means includes a pair of spaced pins on said inertia wheel and a pin on said manifold member disposed to be moved between said pair of stop pins.

6. The invention as set forth in claim 5 wherein friction means are provided between said wheel and said manifold member to normally cause said manifold member to be moved by said wheel, the friction of said friction means being overcome when said manifold member and inertia wheel are moved in unison after the stop limit has been reached by excessive deceleration, whereby excess energy in said inertia wheel is absorbed.

7. The invention as set forth in claim 6 wherein a hub cap is attached to said wheel and said manifold member is secured thereto through said friction means.

8. The invention as set forth in claim 7 wherein said friction means comprises an "O" ring for providing sealing.

9. The invention as set forth in claim 6 wherein said inertia wheel and said manifold member include attachment pins with a spring attached therebetween to normally urge said valve means to a closed position and to provide the threshold at which said valve means opens and closes.

10. The invention as set forth in claim 9 wherein a manually accessible control knob is disposed to be operated to contact said inertia wheel to permit said inertia wheel to be manually rotated with respect to said manifold member to open said valve means to check the operation thereof.

11. The invention as set forth in claim 10 wherein said valve means includes a spring loaded stem in said inertia wheel normally in alignment to block the aperture in said manifold member, said stem being disposed perpendicular to the plane of rotation of said manifold member.

12. The invention as set forth in claim 6 wherein a housing including a cover and lid is provided to house said inertia wheel and a portion of said manifold member, said lid being disposed between said manifold and said hub.

13. The invention as set forth in claim 12 wherein a connector element connects said cover of said housing to said manifold member whereby said cover may be manually gripped and rotated to rotate said manifold member.

14. The invention as set forth in claim 13 wherein rotation of said cover beyond a predetermined speed causes said manifold member to move relative to said inertia wheel to open said valve means in said inertia wheel to open said aperture leading from said chamber to atmosphere.

15. The invention as set forth in claim 14 wherein relative rotation between said inertia wheel and said manifold member beyond a predetermined distance causes said stop means to become operative to rotate said inertia wheel and said manifold member at the same rate of speed.

16. The invention as set forth in claim 15 wherein said wheel includes a hub cap and wherein a pair of friction washers are provided, with one washer being disposed between said lid and the outer surface of said hub cap, and the other friction washer being secured to engage the inner surface of said hub cap.

17. The invention as set forth in claim 16 wherein means including a spring wavy washer is provided to secure said other friction washer against the inner surface of said hub cap.

18. The invention as set forth in claim 17 wherein a pair of tab washers are provided on either side of said spring wavy washer.

19. The invention as set forth in claim 18 wherein relative rapid manual rotation of said cover causes relative displacement of said manifold member with respect to said inertia wheel to test the operation of said valve means, with the continued further rotation causing said stop means to become operative to cause said manifold to slide on said pair of friction washers to test the operation of energy absorption in said control means.

20. The invention as set forth in claim 4 wherein manual means are provided to check the operation of said valve means.

21. The invention as set forth in claim 19 wherein said manual means comprises a cover attached to a hub of said wheel.

22. The invention as set forth in claim 21 wherein an energy absorption system is provided with said manual means being connected to check the operation thereof.

* * * * *